United States Patent
Wanger

[19]

[11] Patent Number: 5,947,606
[45] Date of Patent: Sep. 7, 1999

[54] GAS BEARING FOR A RAPIDLY ROTATING SHAFT

[75] Inventor: Gerhard Wanger, Arberg, Germany

[73] Assignee: Paul Müller GmbH & Co. KG, Nürnberg, Germany

[21] Appl. No.: 09/099,498

[22] Filed: Jun. 18, 1998

[30] Foreign Application Priority Data

Jun. 18, 1997 [DE] Germany .............................. 197 25 784
May 14, 1998 [DE] Germany .............................. 198 21 601

[51] Int. Cl.⁶ .............................. F16C 32/06; F16C 43/02
[52] U.S. Cl. ........................................ 384/100; 29/898.02
[58] Field of Search ................................... 384/100, 107, 384/114, 247, 255; 29/898.02

[56] References Cited

U.S. PATENT DOCUMENTS

| 1,167,672 | 1/1916 | Barry . |
| 3,592,518 | 7/1971 | Pfister et al. . |

FOREIGN PATENT DOCUMENTS

| 593468 | 2/1934 | Germany . |
| 2557805 | 6/1977 | Germany . |
| 3520560 | 12/1986 | Germany . |
| 3528121 | 2/1987 | Germany . |
| 260552 | 9/1988 | Germany . |
| 19525575 | 2/1996 | Germany . |
| 19637598 | 4/1998 | Germany . |
| 59-99112 | 6/1984 | Japan . |

*Primary Examiner*—Thomas R. Hannon
*Attorney, Agent, or Firm*—Steinberg & Raskin, P.C.

[57] ABSTRACT

Gas bearing arrangement for a rapidly rotating shaft with a tool installed at one end including a stationary housing, at least first, second and third bearings arranged in the housing for radially supporting the shaft, the second bearing being arranged between the first and third bearings and each bearing defining a bearing bore, and an adjusting mechanism for adjusting at least one bearing so that the bearing bore thereof may be operatively eccentrically offset relative to the bearing bores of the other bearings. In one embodiment, the bearing bores of the first and third bearings are concentric to each other and the adjusting mechanism is operative on the second, middle bearing. In a method for stabilizing a dynamic gas bearing for a rapidly rotating shaft with a tool installed at one end, the shaft is radially supported in a stationary housing by the bearings and at least one bearings is adjusted so that the bearing bore thereof may be eccentrically offset relative to the bearing bores of the other bearings.

22 Claims, 1 Drawing Sheet

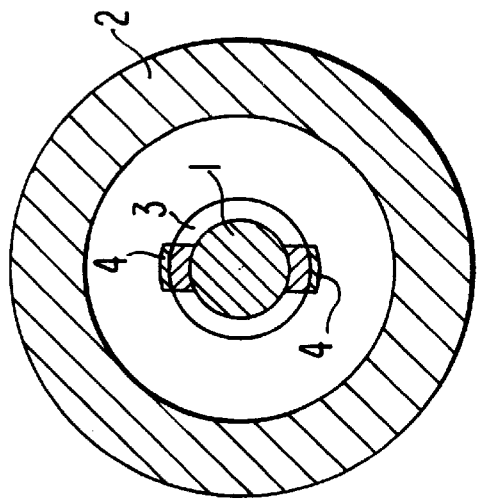
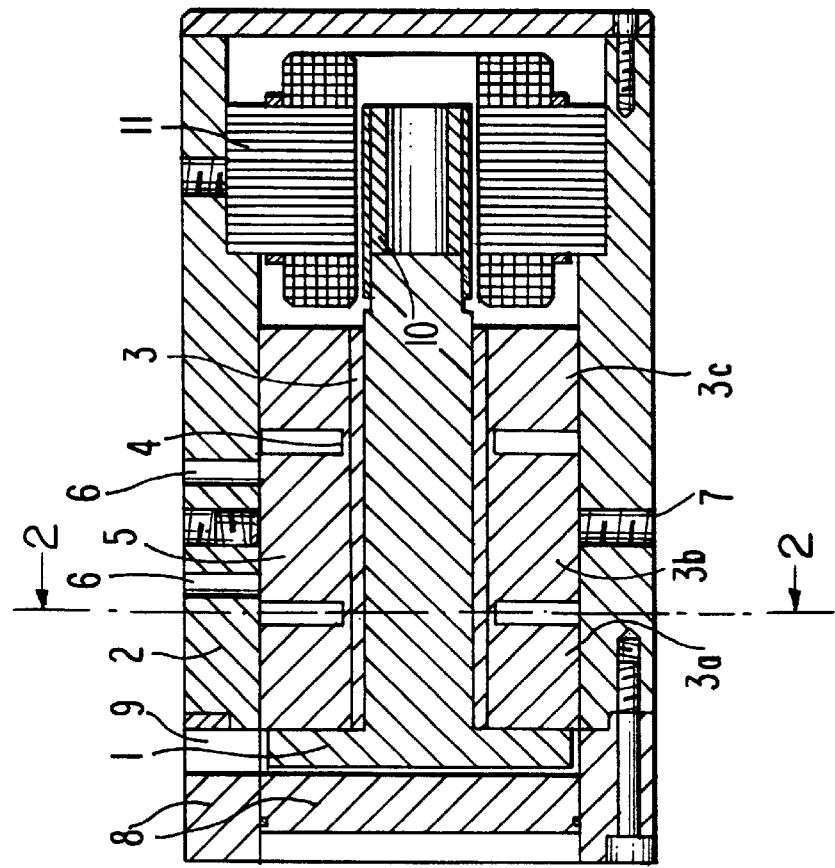

GAS BEARING FOR A RAPIDLY ROTATING SHAFT

FIELD OF THE INVENTION

The present invention relates to gas bearings for a rapidly rotating shaft.

The present invention also relates to methods for stabilizing a dynamic gas bearing for a rapidly rotating shaft with a tool installed at one end.

BACKGROUND OF THE INVENTION

The basic principle for the stabilization of a dynamic gas bearing is described in Japanese Patent Application No. JP 59-991112 (A). As described in this publication, gas bearings are offset eccentrically relative to each other so that bracing, and thereby stabilization of the rapidly rotating shaft, results. The bearings are in an eccentric position relative to each other and unfortunately, are expensive to produce because very narrow manufacturing tolerances must be respected here.

OBJECTS AND SUMMARY OF THE INVENTION

It is an object of the arrangement of bearings in accordance with the invention to enable a machine part consisting of a shaft and tools rotate at the highest possible speed, with the greatest possible running precision and best possible synchronism with low energy consumption.

It is another object of the arrangement of bearings in accordance with the invention to produce the bearing arrangement easily and economically.

In order to obtain these objects and others, a gas bearing in accordance with the present invention provides for an adjustment of the eccentric offset of one or more of the gas bearings thereof by means of a special adjusting device, without respecting narrow manufacturing tolerances. The "eccentric offset" means that the bearing bore of one or more of the bearings is adjusted to have a central axis different than the central axis of the bearing bores of the other bearings. The eccentric offset of the gas bearings relative to each other cause the narrowest possible gap heights to be formed between the bearings and the shaft on the circumference of the gas bearing gap. These narrowest possible gap heights are substantially responsible for the stability and rigidity of the gas bearing arrangement. The smaller these narrowest possible gap heights can be made, the more rigid the bearing arrangement will be and the greater the shaft speeds that can be reached before interfering bearing instabilities occur. Furthermore, the effectiveness of the bearing constantly increases with the reduction of the narrowest possible gap heights, i.e., the bearing requires less and less drive capacity in order to achieve a certain rigidity in order to thus rotate a predetermined mass in a stable manner and at a given speed. As a result, the optimal bearing arrangement is obtained with a maximum reduction of the narrowest possible bearing gap heights.

A static production of the very narrow gap heights by forming through machining or the adjustment by means of set shafts is always tied to very narrow manufacturing tolerances, and limits of what is possible are soon reached. In order to obtain a narrowest possible gap height of from about 1 to 3 $\mu$m for example, the manufacturing tolerances for the shaft and bearing would have to be in the range of from about 0.1 to 0.5 $\mu$m.

It is more advantageous to adjust the narrowest possible gap heights directly during the operation of the gas bearing and thus to utilize the oscillation of the bearing. This dynamic production of the very narrow gap heights is however only possible by means of a precise adjusting device for the eccentric offset of the bearings as described herein.

The dynamic adjustment of the narrowest possible bearing gap heights is carried out in that the bearing is operated up to the speed at which the oscillation instability (the so-called half-frequency swirl) occurs. The bearings are then offset eccentrically by means of the adjusting device so that the narrowest possible gap heights form and the arrangement of bearing becomes stable. In this manner, the speed can be further increased, until the bearing becomes unstable once more, whereupon the narrowest gap heights must be further reduced by means of the adjusting device until stable running resumes. These steps must be repeated until the final operating speed is reached. Often two to three steps are sufficient to achieve the operating speed of the bearing arrangement. For reasons of safety, the bearing arrangement should be adjusted so that the theoretic speed for the half-frequency swirl lies approximately 20% above the operating speed. If the adjusting device is too rough in its operation, the danger exists that the narrowest gap heights become too narrow during adjustment and that the shaft may be blocked or braked, but this does not result in any damage to bearings or shaft thanks to the materials that are used in the bearings.

A large number of possible designs exist for the adjusting devices for the gas bearings, but all of these can be divided into two groups. The first group consists of force-actuated adjusting devices, whereby the exertion of a force upon the bearing causes the above-mentioned eccentric offset of the bearings. Increasing the adjusting force results in this case to a reduction of the narrowest possible gap heights and thereby to an increase of rigidity in the bearings. The force-actuated adjusting devices may be operated pneumatically, hydraulically or by solenoid. The second group of possible designs consists of the path-actuated adjusting devices. In this regard, the eccentric offset of the bearings is effected directly via a path shift, however with additional mechanical translation possibilities making a very fine adjustment possible. The most important path-actuated adjusting devices work on the principle of the inclined plane (screws, cones, cogs, etc.), on the lever principle or through toothed-wheel translations.

In particular, the force-actuated adjusting devices are well suited for actuation via an active control or regulating system. This has the advantage that the eccentric offset of the bearings is adapted to the current load state of the bearing arrangement (external forces, speed, heat, capacity, etc.), so that no critical oscillations occur. This active arrangement of gas bearings is capable of supporting greater external bearing forces and nevertheless, ensuring stable operation. Pressure, speed and temperature sensors can be used to detect the values of bearing states for the control or regulating system.

In another embodiment of the invention, the possibilities and configuration ideas were explored in order to further improve the existing adjusting device so as to obtain adjustment of the eccentric offset of the gas bearings that is very precise and problem free. Since a great number of characteristics and influence values influence the mechanical system of the adjusting device, this makes it possible for a large number of adjusting devices to be used, but most of these are not suited to meet the necessary requirements.

It was found that, not the absolute values, but mostly relative values and ratios of the geometric magnitudes and physical characteristics are significant for a reliable and optimal functioning of the adjusting device, and that all of this must be considered in mutual relationship.

In accordance with one embodiment of the invention, first, second and third sequentially arranged bearings are installed in a fixed housing and are attached so that the first and third bearings have approximately the same radial rigidity relative to the housing. The second, middle gas bearing should have considerably less radial rigidity, less by a factor of at least about 4.3. This mechanical characteristic of the adjusting device has the advantage that no major bending deformations of the bearing occur during the adjustment of the eccentric offset of the bearings relative to each other, so that the precision of form of the bearing gap formed by the shaft and the bearing is maintained. Furthermore, an advantageous effect on the oscillation behavior of the overall bearing arrangement is present because the frequency of the natural resonance of the bearings does not constitute an unfavorable superposition in the housing. Furthermore, the attenuation of the speed-synchronous oscillation of the rapidly rotating shaft may be improved thereby. Another significant advantage is the reduction of the slip-stick effect when adjusting the eccentric offset of the bearing to a precision of a few micrometers, and thus the prevention of blocking of the bearing arrangement when the adjustment is carried out during operation. This is because a large slip-stick effect leads to jarring adjustment of the eccentric adjustment and is very problematic.

The thermal and thermodynamic characteristics are very important for perfect functioning of the adjusting device in connection with the overall bearing arrangement. Since the geometries of the bearing gaps are expressed in the range of micrometers and since considerable friction occurs when the bearings are used with high speeds, characteristics of the components used, such as heat expansion coefficient, heat conductivity and specific heat capacity must be taken into account. The correct selection of materials in view of these characteristics as well as the adaptation of the dimensions of the components to the given characteristics are indispensable. If the proposed conditions are not respected, the shaft will be blocked in the bearing, and this may cause a malfunction and considerable damage to the overall bearing arrangement.

It is furthermore important to establish the correct ratio among the geometric magnitudes of the three gas bearings. The main geometric magnitudes to be mentioned are the bearing diameter, the bearing width, the gap height and its eccentricity. For the formation of maximum pressures and optimal pressure evolutions in the gas bearing gap, these magnitudes are critical.

Of all the bearing possibilities, the gas bearing is the most extensive oscillation system. Instabilities in form of so-called half-frequency swirls and air hammer may occur. During operation at high speed, the normal frequency of the bearing must be passed and a phase shift must be taken into account. All mentioned geometrical magnitudes and physical characteristics have an effect on this oscillation system and only if certain relationships among all influence factors are taken into account and certain values are respected can the complex oscillation behavior of the shaft with tooling and of the three gas bearings in the housing be managed.

Furthermore, when certain technical details described herein are observed, the maximum requirements for a gas bearing arrangement in combination with the adjusting device may be met sufficiently and it becomes possible to enter the very limits of physical possibilities.

A simple and economic adjusting device is described in further detail in the example of an embodiment. In this embodiment, the eccentrically offset bearings are connected to each other by thin ridges which oppose a bending resistance to the offset by means of a path-actuated adjusting device through a screw, so that a great change in torque on the screw only results in a short adjusting path. In this manner, fine adjustment of the narrowest possible gap heights is made possible. Another advantage is the fact that with additional gas-static utilization of the bearing, the gas supply of the individual bearings can take place via the thin ridges.

BRIEF DESCRIPTION OF THE DRAWINGS

A more complete appreciation of the present invention and many of the attendant advantages thereof will be readily understood by reference to the following detailed description when considered in connection with the accompanying drawings in which:

FIG. 1 is cross-sectional view of a bearing arrangement for a rapidly rotating shaft in accordance with the invention; and FIG. 2 is a cross-sectional view of the bearing arrangement for a rapidly rotating shaft shown in FIG. 1 taken along the line 2—2.

DETAILED DESCRIPTION OF THE PREFERRED EMBODIMENTS

Referring to the accompanying drawings wherein like reference numerals designate the same or similar elements, FIG. 1 shows a scaled embodiment of the bearing arrangement of a rapidly rotating tool such as a polygonal mirror and includes an elongate shaft 1 supported aerodynamically in radial and axial directions in a substantially cylindrical housing 2. A disk is mounted at one end of the shaft 1 and a polygonal mirror is attached to the radial surface of the disk. The polygonal mirror is used to deflect a laser ray in optical instruments (e g., scanner, printer, etc.). The laser ray can reach the polygonal mirror through a bore 9 in a closing lid 8 connected to the housing 1 and can be reflected from there. Other tools may of course be attached to the disk.

A drive motor is arranged at the other end of the shaft 1 and comprises a rotor 10 attached to the shaft 1 and a stator 11 mounted in the housing 2. The attachment between the shaft 1 and rotor 10 is ensured by a snap-on connection, or other comparable attachment means.

For the radial air bearing of the shaft 1, a plurality of bearings are provided, first, second and third sequentially arranged bearings designated 3a, 3b, 3c in the illustrated embodiment. Each bearing 3a,3b,3c defines a bearing bore. The first and third bearings 3a and 3c are preferably fixedly secured to the housing 1, e.g., cemented into the housing 2. The bearings are attached to the housing 2, e.g., by inserting cement or another hardenable, cement-like curing agent into the cavity in the housing via a screw in a threaded bore 7. The second or middle bearing 3b is connected via thin ridges 4 arranged on a bearing body 3 to the first and third bearings 3a,3c and can be displaced radially by adjusting means, such as a screw 5 extending through an aperture in the housing 2. Once the gas bearing has been adjusted for a stable running behavior as described above, the middle bearing 3b can be cemented in addition to the housing 2 by means of the bores 6. The bearing body or cup 3 extends through the bearing bores defined by the bearings 3a,3b,3c, is preferably made of graphite and is pressed into the bearings 3a,3b,3c.

With respect to the adjusting means, a plurality of screws could also be provided at different radial locations about the middle bearing 3b in order to adjust the eccentricity of the bearing bore defined by the middle bearing 3b relative to the bearing bores defined by bearings 3a and 3c.

The screw 5 and bearing body 3 may be permanently attached to the housing 2, such as by cementing.

The axial surfaces of the disk at the end of shaft 1 serves for bilateral axial support. The axial bearing between shaft 1 and bearing 3a is supplied compressed air via the radial bearing.

A person skilled in the art should respect all ratios and relationships of the geometric magnitudes and the physical characteristics mentioned below in order to obtain an optimal embodiment.

Specifically, the shaft 1 should be constructed such that the product of the density and the elasticity module of the material of the shaft is at least about 6.7 times greater than the product of the density and the elasticity module of the material from which the bearings 3a,3b,3c are constructed. A ratio of the sum of mass of the bearings 3a,3c to the elasticity module of the bearings 3a,3c should be at least about 1.5 greater than a ratio of the mass to the elasticity module of the middle bearing 3b. The product of the elasticity module and the rigidity of the middle bearing 3b should be greater by a factor of at least about 2.7 than the product of the elasticity module and rigidity of the other bearings 3a,3c relative to the housing 2. The ratio of linear heat expansion coefficient to heat conductivity in the middle bearing 3b should be at the most about 2 times greater than the ratio of linear heat expansion coefficient to heat conductivity in the other bearings 3a,3c. The ratio of the bearing bore diameter to the bearing length in the middle bearing 3b should be at least about 0.3 times and at the most about 1.5 greater than a ratio of bearing diameter to bearing length in the first or third bearing 3a,3c. The ratio of bearing diameter to narrowest bearing gap height in the second bearing 3b should be at the most about 3.7 greater than the ratio of the bearing diameter to the narrowest bearing gap height in the first or third bearing 3a,3c. The product of the bearing length and narrowest bearing gap height of the second bearing 3b should be at most about 4.5 greater than the product of the bearing length and the narrowest bearing gap height of the first or third bearing 3a,3c. The ratio of the widest bearing gap height to the narrowest bearing gap height should never be below the value 3.3 in any of the bearings 3a,3b,3c. The product of the widest bearing gap height to the narrowest bearing gap height of the first or third bearing 3a,3c should be by about 1.2 times greater than a product of the widest bearing gap height to the narrowest bearing gap height of the second bearing 3b.

In alternative embodiments, the second bearing 3b may be fixedly installed in the housing 2 and the first and third bearings 3a,3c eccentrically offset by adjusting means. Also, all of the first, second and third bearings 3a,3b,3c may be offset eccentrically relative to each other by a plurality of adjusting means such as screws.

In the method for stabilizing a dynamic gas bearing for a rapidly rotating shaft with a tool installed at one end, the shaft 1 is radially supported in the stationary housing 2 by means of the first, second and third bearings 3a,3b,3c and the second bearing 3b is adjusted so that the bearing bore thereof may be eccentrically offset relative to the bearing bores of the other bearings 3a,3c. Adjustment may entail turning the screw 5 extending through the housing 2 to thereby press the bearing 3b against the bearing body 3.

Obviously, numerous modifications and variations of the present invention are possible in light of the teachings hereof. Therefore, it is to be understood that the invention can be varied from the detailed description above within the scope of the claims appended hereto.

I claim:

1. Gas bearing arrangement for a rapidly rotating shaft with a tool installed at one end, comprising
    a stationary housing,
    at least first, second and third bearings arranged in said housing for radially supporting the shaft, said second bearing being arranged between said first and third bearings, each of said bearings defining a bearing bore through which the shaft passes, and
    adjusting means for adjusting at least one of said bearings so that said bearing bore of said at least one bearing is eccentrically offset relative to said bearing bores of the other of said bearings.

2. The bearing arrangement of claim 1, further comprising
    a bearing body extending through said bearing bores of said first, second and third bearings, the shaft passing through said bearing body, and
    ridges arranged on said bearing body for connecting said first, second and third bearings.

3. The bearing arrangement of claim 2, wherein said adjusting means comprise at least one screw extending through said housing for pressing said at least one bearing against said bearing body.

4. The bearing arrangement of claim 3, wherein said at least one screw and said bearing body are fixedly secured to said housing.

5. The bearing arrangement of claim 1, wherein said bearing bores of said first and third bearings are concentric to each other, said at least one of said bearing consisting of said second bearing such that said adjusting means are arranged to adjust said second bearing so that said bearing bore of said second bearing is eccentrically offset relative to said bearing bores of said first and third bearings.

6. The bearing arrangement of claim 5, wherein said second bearing has a radial rigidity value relative to said housing which is at least 4.3 times less than a radial rigidity value of said first and third bearings relative to said housing, the radial rigidity value of said first and third bearings being substantially equal.

7. The bearing arrangement of claim 6, wherein the shaft is constructed such that the product of density and elasticity module of the material of the shaft is at least about 6.7 times greater than the product of density and elasticity module of the material from which said first, second and third bearings are constructed.

8. The bearing arrangement of claim 5, wherein a ratio of a sum of mass of said first and third bearings to elasticity module of said first or third bearing is at least 1.5 greater than a ratio of mass to elasticity module of said second bearing.

9. The bearing arrangement of claim 5, wherein a product of elasticity module and rigidity of said second bearing is greater by a factor of at least about 2.7 than a product of elasticity module and rigidity of said first and third bearings relative to said housing.

10. The bearing arrangement of claim 5, wherein a ratio of linear heat expansion coefficient to heat conductivity in said second bearing is at the most 2 times greater than a ratio of linear heat expansion coefficient to heat conductivity in said first or third bearing.

11. The bearing arrangement of claim 5, wherein said first and third bearings are cemented into said housing.

12. The bearing arrangement of claim 5, wherein a ratio of bearing diameter to bearing length in said second bearing is at least 0.3 times and at the most 1.5 greater than a ratio of bearing diameter to bearing length in said first or third bearing.

13. The bearing arrangement of claim 5, wherein a ratio of bearing diameter to narrowest bearing gap height in said second bearing is at the most 3.7 greater than a ratio of bearing diameter to narrowest bearing gap height in said first or third bearing.

14. The bearing arrangement of claim 5, wherein a product of bearing length and narrowest bearing gap height of said second bearing is at most 4.5 greater than a product of bearing length and narrowest bearing gap height of said first or third bearing.

15. The bearing arrangement of claim 5, wherein a ratio of widest bearing gap height to narrowest bearing gap height is never below the value 3.3 in said first, second and third bearings.

16. The bearing arrangement of claim 5, wherein a product of widest bearing gap height to narrowest bearing gap height of said first or third bearing is by 1.2 times greater than a product of the widest bearing gap height to the narrowest bearing gap height of said second bearing.

17. The bearing arrangement of claim 5, wherein said second bearing is fixedly installed and said first and third bearings are eccentrically offset by adjusting means.

18. The bearing arrangement of claim 5, wherein said first, second and third bearings are offset eccentrically relative to each other by a plurality of said adjusting means.

19. A method for stabilizing a dynamic gas bearing for a rapidly rotating shaft with a tool installed at one end, comprising the steps of:

radially supporting the shaft in a stationary housing by means of at least first, second and third bearings, said second bearing being arranged between said first and third gas bearings, each of said bearings defining a bearing bore through which the shaft passes, and adjusting at least one of said bearings so that said bearing bore of said at least one bearing is eccentrically offset relative to said bearing bores of the other of said bearings.

20. The method of claim 19, further comprising the step of:

providing a bearing body extending through said bearing bores of said first, second and third bearings and around the shaft, and arranging ridges on said bearing body for connecting said first, second and third bearings.

21. The method of claim 20, wherein the step of adjusting said at least one of said bearings comprise the step of turning a screw extending through said housing to thereby press said at least one bearing against said bearing body.

22. The method of claim 19, further comprising the step of:

fixedly securing the other of said bearings in said housing.

* * * * *